(12) United States Patent
Ebuchi et al.

(10) Patent No.: US 11,787,392 B2
(45) Date of Patent: Oct. 17, 2023

(54) CONTROL SYSTEM FOR HYBRID VEHICLE

(71) Applicant: TOYOTA JIDOSHA KABUSHIKI KAISHA, Aichi (JP)

(72) Inventors: Hiroaki Ebuchi, Hadano (JP); Yukari Okamura, Gotemba (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 436 days.

(21) Appl. No.: 17/235,937

(22) Filed: Apr. 21, 2021

(65) Prior Publication Data

US 2021/0370910 A1    Dec. 2, 2021

(30) Foreign Application Priority Data

Jun. 1, 2020 (JP) ................. 2020-095275

(51) Int. Cl.
*B60W 20/40* (2016.01)
*B60W 30/182* (2020.01)
*B60W 50/00* (2006.01)

(52) U.S. Cl.
CPC .......... *B60W 20/40* (2013.01); *B60W 30/182* (2013.01); *B60W 50/0097* (2013.01); *B60W 2540/103* (2013.01); *B60W 2710/081* (2013.01)

(58) Field of Classification Search
CPC ............... B60W 20/40; B60W 30/182; B60W 50/0097; B60W 2540/103; B60W 2710/081; B60W 30/192; B60W 2030/203; B60W 2540/10; B60W 10/023; B60W 10/06; B60W 10/08; B60W 10/115; B60W 10/26; B60W 20/10; B60W 20/11; B60W 20/13; B60W 30/19; B60W 20/20; B60K 2006/381; B60K 6/365; B60K 6/387; B60K 6/445; Y02T 10/62; Y02T 10/72

See application file for complete search history.

(56) References Cited

U.S. PATENT DOCUMENTS

2016/0368361 A1* 12/2016 Endo .................. F16H 1/46
2019/0047398 A1    2/2019 Endo et al.

FOREIGN PATENT DOCUMENTS

JP        6451524 B2    1/2019
JP      201935449 A     3/2019

* cited by examiner

*Primary Examiner* — Aniss Chad
*Assistant Examiner* — Chase L Cooley
(74) *Attorney, Agent, or Firm* — HAUPTMAN HAM, LLP

(57) ABSTRACT

A control system for a hybrid vehicle configured to shift an operating mode from a single-motor mode to a hybrid-low mode without causing a temporal drop in a drive force. A controller is configured to predict an execution of a mode change from the single-motor mode to the first hybrid mode, and to execute the mode change from the single-motor mode to the hybrid-low mode via a hybrid-high mode, if the execution of the mode change from the single-motor mode to the hybrid-low mode is predicted.

8 Claims, 16 Drawing Sheets

FIG. 3

| OPERATING MODE | | | CL1 | CL2 | B1 | MG1 | MG2 | ENG |
|---|---|---|---|---|---|---|---|---|
| HV MODE | HV-LOW MODE | | ● | – | – | G | M | ON |
| | HV-HIGH MODE | | – | ● | – | G | M | ON |
| | FIXED MODE | | ● | ● | – | | | ON |
| EV MODE | DUAL-MOTOR MODE | EV-LOW MODE | – | – | ● | M | M | OFF |
| | | EV-HIGH MODE | – | ● | ● | M | M | OFF |
| | SINGLE-MOTOR MODE | | – | – | – | | M | OFF |

CONTROL SYSTEM FOR HYBRID VEHICLE

CROSS-REFERENCE TO RELATED APPLICATIONS

The present disclosure claims the benefit of Japanese Patent Application No. 2020-095275 filed on Jun. 1, 2020 with the Japanese Patent Office, the disclosures of which are incorporated herein by reference in its entirety.

BACKGROUND

Field of the Invention

Embodiments of the present disclosure relate to the art of a control system for a hybrid vehicle in which a prime mover includes an engine and a motor, and in which an operating mode can be selected from a plurality of modes.

Discussion of the Related Art

JP-B2-6451524 and JP-A-2019-035449 describe control systems each for a hybrid vehicle in which a prime mover includes an engine and two motors. In each of the hybrid vehicles described in JP-B2-6451524 and JP-A-2019-035449, an output torque of the engine is distributed to a first motor and to an output member through a power split mechanism. The torque transmitted to the first motor is translated into electricity and supplied to a second motor to generate a torque, and the torque generated by the second motor is added to the torque of the engine delivered directly to drive wheels. An operating mode of the hybrid vehicle of this kind is selected from a hybrid-low mode and a hybrid-high mode, and a speed ratio between an engine speed and an output speed is changed by shifting the operating mode between the hybrid-low mode and the hybrid-high mode by manipulating a first clutch and a second clutch. Specifically, the speed ratio between the engine speed and the output speed in the hybrid-low mode is greater than that in the hybrid-high mode. That is, a drive torque in the hybrid-low mode is larger than that in the hybrid-high mode. In addition, the operating mode of the hybrid vehicle of this kind may be further selected from an electric vehicle mode (or a single-motor mode) in which the hybrid vehicle is propelled only by the torque of the second motor.

In the hybrid vehicle of this kind, the operating mode is selected based on a position of an accelerator pedal and a required drive force. For example, when the accelerator pedal is depressed to increase the drive force during propulsion in the electric vehicle mode, the engine is started to shift the operating mode to the hybrid mode. In this situation, if a relatively large drive force is required, the operating mode will be shifted to the hybrid-low mode in which a larger drive force can be generated, by starting the engine while engaging the first clutch. Specifically, an input element (i.e., a drive member) and an output element (i.e., a driven member) of the first clutch are engaged to each other so that the torque is transmitted therebetween. In this situation, in order to reduce an engagement shock, a speed difference between the input element and the output element is reduced to a synchronous speed. However, in the case of shifting the operating mode from the electric vehicle mode to the hybrid-low mode, the speed difference is relatively large. In this case, therefore, it would take a long time to complete an engagement operation of the first clutch, and hence it would take a long time until the engine is started.

In other words, it would take a long time until the drive force is increased and the drive may feel uncomfortable feeling or discomfort feeling.

SUMMARY

Aspects of embodiments of the present disclosure have been conceived noting the foregoing technical problems, and it is therefore an object of the present disclosure to provide a control system for a hybrid vehicle configured to shift an operating mode from an electric vehicle mode to a mode in which a relatively larger drive force can be generated without causing a temporal drop in a drive force to propel the hybrid vehicle.

The control system according to the exemplary embodiment of the present disclosure is applied to a hybrid vehicle comprising: a prime mover including an engine, a first motor, and a second motor; a first differential mechanism that performs a differential action among a first rotary element that is connected to the engine, a second rotary element that is connected to the first motor, and a third rotary element; a second differential mechanism that performs a differential action among a fourth rotary element that is connected to the second motor and a pair of drive wheels, a fifth rotary element that is connected to the third rotary element, and a sixth rotary element; a first engagement device that selectively connects the first rotary element to the sixth rotary element; and a second engagement device that selectively connects any two of the fourth rotary element, the fifth rotary element, and the sixth rotary element. An operating mode of the hybrid vehicle is selected from a plurality of modes including: a first hybrid mode established by engaging the first engagement device; a second hybrid mode established by engaging the second engagement device, in which the torque delivered to the drive wheels is smaller compared to the first hybrid mode; and a single-motor mode established by disengaging both of the first engagement device and the second engagement device, in which the hybrid vehicle is propelled only by a drive torque generated by the second motor. In the hybrid vehicle, each of the first engagement device and the second engagement device comprises a drive member and a driven member engaged to each other to transmit the torque. A speed difference between the drive member and the driven member of each of the first engagement device and the second engagement device is controlled by the first motor. In order to achieve the above-explained objective, according to the exemplary embodiment of the present disclosure, the control system comprises a controller that is configured to: predict an execution of a mode change from the single-motor mode to the first hybrid mode; and execute the mode change from the single-motor mode to the first hybrid mode via the second hybrid mode, if the execution of the mode change from the single-motor mode to the first hybrid mode is predicted.

In a non-limiting embodiment, the controller may comprise: a mode change predictor that predicts an execution of the mode change; and a mode changer that changes the operating mode based on a prediction made by the mode change predictor. In addition, controller may be further configured to execute the mode change from the single-motor mode to the first hybrid mode via the second hybrid mode by the mode changer, if the execution of the mode change from the single-motor mode to the first hybrid mode is predicted by the mode change predictor.

In a non-limiting embodiment, the controller may be further configured to establish the first hybrid mode after starting an operation to establish the second hybrid mode, if the execution of the mode change from the single-motor mode to the first hybrid mode is predicted.

In a non-limiting embodiment, the controller may be further configured to: predict the execution of the mode change from the single-motor mode to the first hybrid mode based on a position of an accelerator; and execute the mode change from the single-motor mode to the first hybrid mode if the position of an accelerator is deeper than predetermined degrees.

In a non-limiting embodiment, the controller may be further configured to: reduce a speed difference between the drive member and the driven member of the second engagement device to a predetermined value possible to engage the second engagement device, in a case of shifting the operating mode from the single-motor mode to the first hybrid mode via the second hybrid mode; and engage the first engagement device while reducing a speed difference between the drive member and the driven member of the first engagement device to a predetermined value possible to engage the first engagement device, after the completion of engagement of the second engagement device.

In a non-limiting embodiment, the controller may be further configured to disengage the second engagement device after the completion of the first engagement device, in the case of shifting the operating mode from the single-motor mode to the first hybrid mode via the second hybrid mode.

In a non-limiting embodiment, the speed difference between the drive member and the driven member of the first engagement device in the case of shifting the operating mode from the single-motor mode to the first hybrid mode may be larger than the speed difference between the drive member and the driven member of the second engagement device in the case of shifting the operating mode from the single-motor mode to the second hybrid mode.

In a non-limiting embodiment, the controller may be further configured to start the engine by the first motor when shifting the operating mode from the single-motor mode to the second hybrid mode.

Thus, according to the exemplary embodiment of the present disclosure, the operating mode is shifted from the single-motor mode to the first hybrid mode via the second hybrid mode. Specifically, the operating mode is shifted from the single-motor mode to the first hybrid mode by starting the engine while engaging the first clutch. When engaging the first clutch, a speed difference between the drive member and the driven member of the first engagement device is reduced to a predetermined value possible to engage the first engagement device without generating an engagement shock. However, the speed difference between the drive member and the driven member of the first engagement device in the case of shifting the operating mode from the single-motor mode to the first hybrid mode is larger than the speed difference between the drive member and the driven member of the second engagement device in the case of shifting the operating mode from the single-motor mode to the second hybrid mode. According to the exemplary embodiment of the present disclosure, therefore, the operating mode is shifted from the single-motor mode to the first hybrid mode via the second hybrid mode that is established by engaging the second clutch. For this reason, the engine may be started earlier to increase the drive force promptly, in comparison with a case of shifting the operating mode from the single-motor mode directly to the first hybrid mode.

Since the engine is started earlier, a plateau period of the drive force can be reduced when shifting the operating mode from the single-motor mode to the first hybrid mode.

In addition, the hybrid vehicle can be accelerated smoothly and continuously in the case of shifting the operating mode from the single-motor mode to the first hybrid mode.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

FIG. 3 is a table showing engagement states of engagement devices and operating conditions of the prime movers in each operating mode;

DETAILED DESCRIPTION OF THE PREFERRED EMBODIMENT(S)

Figure 1:
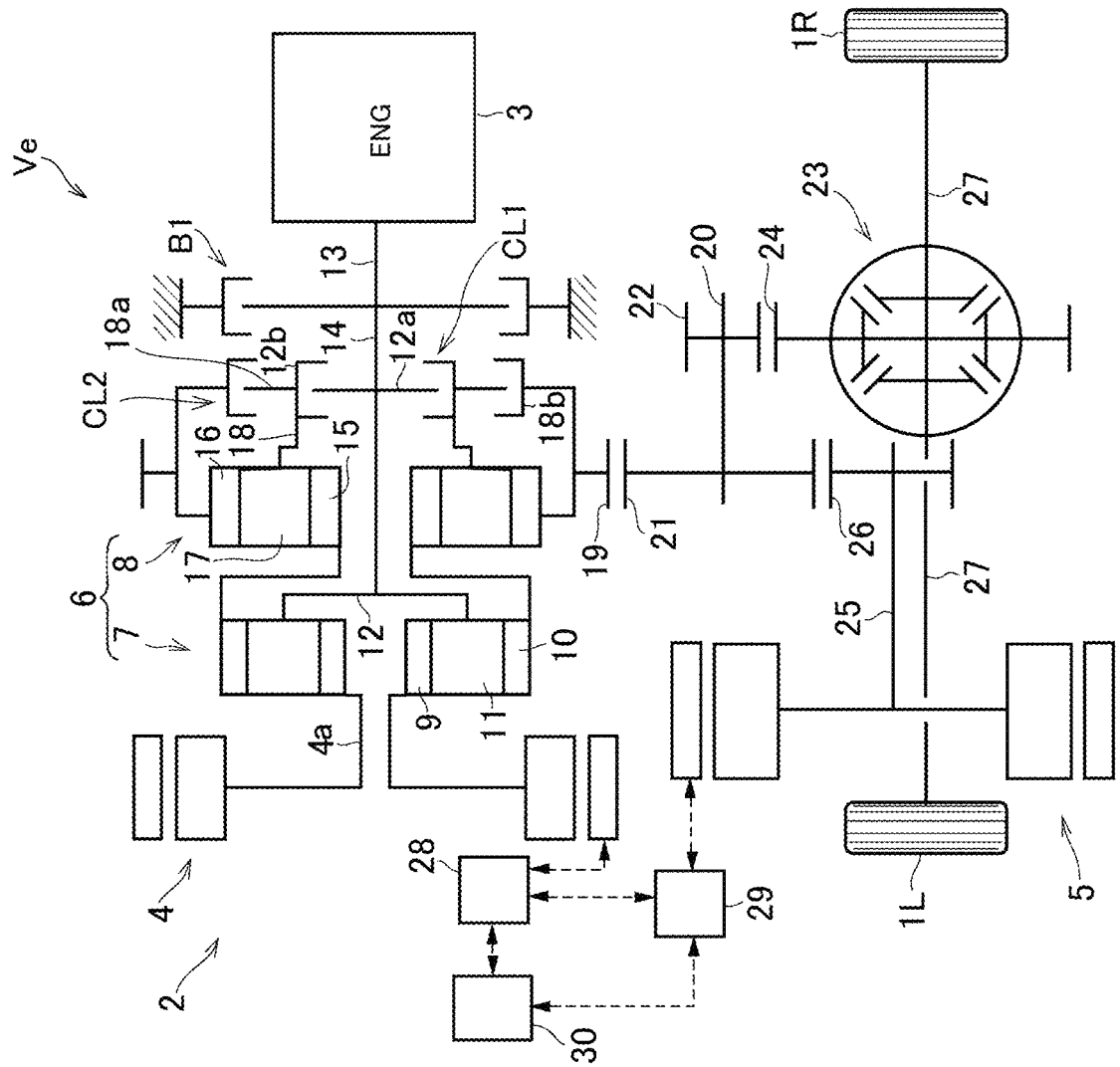
FIG. 1 is a skeleton diagram showing a drive unit of a hybrid vehicle to which the control system according to the example of the present disclosure is applied.

An exemplary embodiment of the present disclosure will now be explained with reference to the accompanying drawings. Referring now to FIG. 1, there is shown one example of a structure of a hybrid vehicle (as will be simply called the "vehicle" hereinafter) Ve to which the control system according to the exemplary embodiment of the present disclosure is applied. Specifically, FIG. 1 shows a drive unit 2 of the vehicle Ve that drives a pair of front wheels 1R and 1L, and the drive unit 2 comprises an engine (referred to as "ENG" in the drawings) 3, a first motor (referred to as "MG1" in the drawings) 4, and a second motor (referred to as "MG2" in the drawings) 5. According to the exemplary embodiment, a motor-generator having a generating function is adopted as the first motor 4. In the vehicle Ve, a speed of the engine 3 is controlled by the first motor 4, and the second motor 5 is driven by electric power generated by the first motor 4 to generate a drive force for propelling the vehicle Ve. Optionally, the motor-generator having a generating function may also be employed as the second motor 5.

A power split mechanism 6 as a differential mechanism is connected to the engine 3. The power split mechanism 6 includes a power split section 7 that distributes an output torque of the engine 3 to the first motor 4 side and to an output side, and a transmission section 8 that alters a torque split ratio.

In the vehicle Ve shown in FIG. 1, a single-pinion planetary gear unit adapted to perform differential action among three rotary elements is adopted as the power split section 7. Accordingly, the power split section 7 serves as a first differential mechanism of the embodiment. Specifically, the power split section 7 comprises: a sun gear 9; a ring gear 10 as an internal gear arranged concentrically around the sun gear 9; a plurality of pinion gears 11 interposed between the sun gear 9 and the ring gear 10 while being meshed with the both gears 9 and 10; and a carrier 12 supporting the pinion gears 11 in a rotatable manner. In the power split mechanism 6, accordingly, the carrier 12 serves as a first rotary element, the sun gear 9 serves as a second rotary element, and the ring gear 10 serves as a third rotary element.

An output shaft 13 of the engine 3 is connected to an input shaft 14 of the power split mechanism 6 connected to the carrier 12 so that output power of the engine 3 is applied to the carrier 12. Optionally, an additional gear unit (not shown) may be interposed between the input shaft 14 and the carrier 12, and a damper device and a torque converter (neither of which are shown) may be interposed between the output shaft 13 and the input shaft 14.

The sun gear 9 is connected to the first motor 4. In the vehicle Ve shown in FIG. 1, the power split section 7 and the first motor 4 are arranged concentrically with a rotational center axis of the engine 3, and the first motor 4 is situated on an opposite side of the engine 3 across the power split section 7. The transmission section 8 is interposed coaxially between the power split section 7 and the engine 3.

The transmission section 8 is also a single-pinion planetary gear unit comprising: a sun gear 15; a ring gear 16 as an internal gear arranged concentrically around the sun gear 15; plurality of pinion gears 17 interposed between the sun gear 15 and the ring gear 16 while being meshed with the both gears 17 and 18; and a carrier 18 supporting the pinion gears 17 in a rotatable manner. Thus, the transmission section 8 is also adapted to perform a differential action among the sun gear 15, the ring gear 16, and the carrier 18. Accordingly, the transmission section 8 serves as a second differential mechanism of the embodiment. In the transmission section 8 the sun gear 15 is connected to the ring gear 10 of the power split section 7, and the ring gear 16 is connected to an output gear 19. In the power split mechanism 6, accordingly, the ring gear 16 serves as a fourth rotary element, the sun gear 15 serves as a fifth rotary element, and the carrier 18 serves as a sixth rotary element.

In order to use the power split section 7 and the transmission section 8 as a complex planetary gear unit, a first clutch CL1 as a first engagement device is disposed to selectively connect the carrier 18 of the transmission section 8 to the carrier 12 of the power split section 7 connected to the input shaft 14. The first clutch CL1 includes a pair of rotary members 12a and 12b selectively engaged to each other to transmit the torque. Specifically, the rotary member 12a is fitted onto the input shaft 14, and the rotary member 12b is connected to the carrier 18 of the transmission section 8. Accordingly, one of the rotary members 12a and 12b serves as a drive member of the embodiment, and another one of the rotary members 12a and 12b serves as a driven member of the embodiment. For example, a wet-type multiple plate clutch or a dog clutch may be adopted as the first clutch CL1. Otherwise, a normally stay clutch may also be adopted as the first clutch CL1. An engagement state of the normally stay clutch is switched upon reception of the command signal, and the normally stay clutch stays in the current engagement state even if the signal transmission thereto is interrupted. Thus, in the drive unit 2 shown in FIG. 1, the power split section 7 is connected to the transmission section 8 to serve as a complex planetary gear unit by engaging the first clutch CL1. In the complex planetary gear unit thus formed, the carrier 12 of the power split section 7 is connected to the carrier 18 of the transmission section 8 to serve as an input element, the sun gear 9 of the power split section 7 serves as a reaction element, and the ring gear 16 of the transmission section 8 serves as an output element. That is, the complex planetary gear unit is configured such that the input shaft 14, the output shaft 4a of the first motor 4, and an after-mentioned driven gear 21 are allowed to rotate in a differential manner.

A second clutch CL2 as a second engagement device is disposed to rotate the rotary elements of the transmission section 8 integrally. For example, a friction clutch, a dog clutch and a normally stay clutch may also be adopted as the second clutch CL2 to selectively connect the carrier 18 to the ring gear 16 or the sun gear 15, or to connect the sun gear 15 to the ring gear 16. In the drive unit 2 shown in FIG. 1, specifically, the second clutch CL2 is engaged to connect the carrier 18 to the ring gear 16 to rotate the rotary elements of the transmission section 8 integrally. The second clutch CL2 includes a pair of rotary members 18a and 18b selectively engaged to each other to transmit the torque. Specifically, the rotary member 18a is connected to the carrier 18 of the transmission section 8, and the rotary member 18b is connected to the ring gear 16 of the transmission section 8. Accordingly, one of the rotary members 18a and 18b also serves as the drive member of the embodiment, and another one of the rotary members 18a and 18b also serves as the driven member of the embodiment.

A counter shaft 20 extends parallel to a common rotational axis of the engine 3, the power split section 7, and the transmission section 8. A driven gear 21 is fitted onto one end of the counter shaft 20 to be meshed with the output gear 19, and a drive gear 22 is fitted onto the other end of the counter shaft 20 to be meshed with a ring gear 24 of a differential gear unit 23 as a final reduction unit. The driven gear 21 is also meshed with a drive gear 26 fitted onto a rotor shaft 25 of the second motor 5 so that power or torque of the second motor 5 is synthesized with power or torque of the output gear 19 at the driven gear 21 to be distributed from the differential gear unit 23 to the front wheels 1R and 1L via each driveshaft 27.

In order to selectively stop a rotation of the engine 3 when operating the first motor 4 to propel the vehicle Ve, a brake B1 as a third engagement device is arranged in the drive unit 2. For example, a frictional engagement device or a dog brake may be adopted as the brake B1, and the brake B1 is fixed to a predetermined stationary member in radially outer side of the output shaft 13 or the input shaft 14. The carrier 12 of the power split section 7 and the carrier 18 of the transmission section 8 are allowed to serve as reaction elements, and the sun gear 9 of the power split section 7 is allowed to serve as an input element by applying the brake B1 to halt the output shaft 13 or the input shaft 14. To this end, the brake B1 may be adapted to stop the rotation of the output shaft 13 or the input shaft 14 not only completely but also incompletely to apply a reaction torque to those shafts. Alternatively, a one-way clutch may be used instead of the brake B1 to restrict a reverse rotation of the output shaft 13 or the input shaft 14.

A first power control system 28 is connected to the first motor 4, and a second power control system 29 is connected to the second motor. Each of the first power control system 28 and the second power control system 29 includes an inverter and a converter. The first power control system 28 and the second power control system 29 are connected to each other, and also connected individually to an electric storage device 30 including a lithium ion battery, a capacitor, and a solid-state battery. For example, when the first motor 4 is operated as a generator while establishing a reaction torque, an electric power generated by the first motor 4 may be supplied directly to the second motor 5 without passing through the electric storage device 30.

Characteristics of the lithium ion battery, the capacitor, and the solid-state battery adopted as the electric storage device 30 are different from one another. The electric storage device 30 may also be formed by combining those storage devices arbitrarily according to need.

Figure 2:
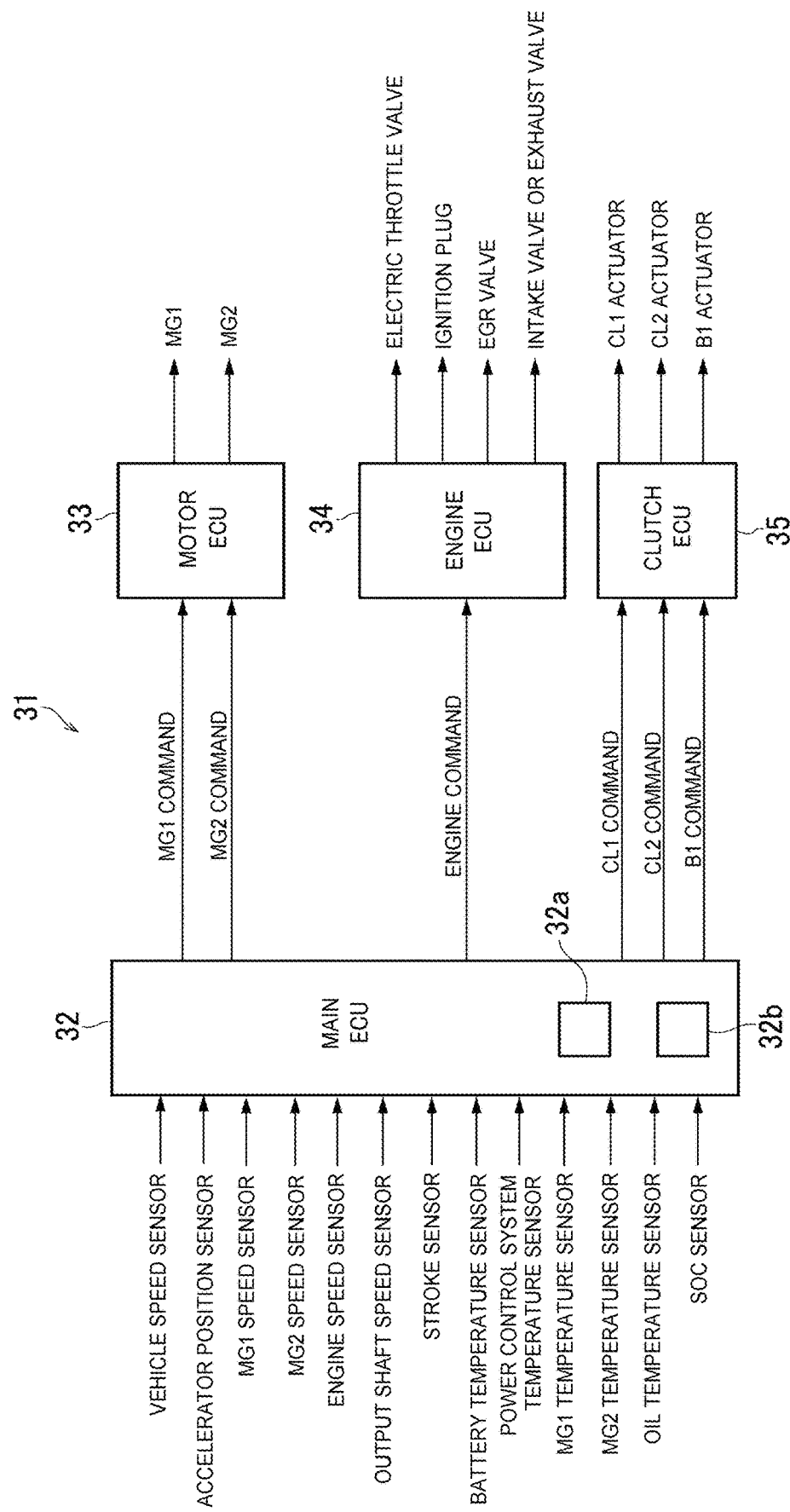
FIG. 2 is a block diagram showing a structure of an electronic control unit.

In order to control the first power control system 28, the second power control system 29, the first clutch CL1, the second clutch CL2, the brake B1 and so on, the vehicle Ve is provided with an electronic control unit (to be abbreviated as the "ECU" hereinafter) 31 as a controller. The ECU 31 has a microcomputer as its main constituent, and as shown in FIG. 2, the ECU 31 comprises a main ECU 32, a motor ECU 33, an engine ECU 34 and a clutch ECU 35.

The main ECU 32 is configured to execute a calculation based on incident data transmitted from sensors as well as maps and formulas installed in advance, and transmits a calculation result to the motor ECU 33, the engine ECU 34 and the clutch ECU 35 in the form of command signal. For example, the main ECU 32 receives data about; a vehicle speed; an accelerator position; a speed of the first motor 4; a speed of the second motor 5; a speed of the output shaft 13 of the engine 3; an output speed such as a rotational speed of the counter shaft 20 of the transmission section 8; strokes of pistons (or actuators) of the clutches CL1, CL2, and the brake B1; a temperature of the electric storage device 30; temperatures of the power control systems 28 and 29; a temperature of the first motor 4; a temperature of the second motor 5; a temperature of oil (i.e., ATF) lubricating the power split section 7 and the transmission section 8; a state of charge (to be abbreviated as the "SOC" hereinafter) level of the electric storage device 30 and so on. The main ECU 32 is provided with a mode change predictor 32a, and a mode changer 32b. Specifically, the mode change predictor 32a is configured to predict an execution of a mode change, based on a required drive force governed by a vehicle speed and an accelerator position, with reference to after-mentioned maps shown in FIGS. 10 and 11. On the other hand, the mode changer 32b is configured to change the operating mode based on a prediction made by the mode change predictor 32a.

Specifically, command signals of output torques and speeds of the first motor 4 and the second motor 5 are transmitted from the main ECU 32 to the motor ECU 33. Likewise, command signals of an output torque and a speed of the engine 3 are transmitted from the main ECU 32 to the engine ECU 34, and command signals of torque transmitting capacities (including "0") of the clutches CL1, CL2, and the brake B1 are transmitted from the main ECU 32 to the clutch ECU 35.

The motor ECU 33 calculates current values applied to the first motor 4 and the second motor 5 based on the data transmitted from the main ECU 32, and transmits calculation results to the motors 4 and 5 in the form of command signals. In the vehicle Ve, an AC motor is adopted as the first motor 4 and the second motor 5. In order to control the AC motor, the command signal transmitted from the motor ECU 33 includes command signals for controlling a frequency of a current generated by the inverter and a voltage value boosted by the converter.

The engine ECU 34 calculates current values and pulse numbers to control opening degrees of an electronic throttle valve, an EGR (Exhaust Gas Restriction) valve, an intake valve, an exhaust valve, and an exhaust valve, and to activate an ignition plug, based on the data transmitted from the main ECU 32. Calculation results are transmitted from the engine ECU 34 to the valves and the plug in the form of command signals. Thus, the engine ECU 34 transmits command signals for controlling a power, an output torque and a speed of the engine 3.

The clutch ECU 35 calculates current values supplied to actuators controlling engagement pressures of the clutches CL1, CL2, and the brake B1 based on the data transmitted from the main ECU 32, and transmits calculation results to the actuators of those engagement devices in the form of command signals.

In the vehicle Ve, an operating mode may be selected from a hybrid mode (to be abbreviated as the "HV mode" hereinafter) in which the vehicle Ve is propelled by a drive torque generated by the engine 3, and an electric vehicle mode (to be abbreviated as the "EV mode" hereinafter) in which the vehicle Ve is propelled by drive torques generated by the first motor 4 and the second motor 5 without using the engine 3. The HV mode may be selected from a Hybrid-Low mode (to be abbreviated as the "HV-Low mode" hereinafter), a Hybrid-High mode (to be abbreviated as the "HV-High mode" hereinafter), and a fixed mode. Specifically, in the HV-Low mode, a rotational speed of the engine 3 (i.e., a rotational speed of the input shaft 14) is increased higher than a rotational speed of the ring gear 16 of the transmission section 8 when a rotational speed of the first motor 4 is reduced to substantially zero. In turn, in the HV-High mode, a rotational speed of the engine 3 is reduced lower than a rotational speed of the ring gear 16 of the transmission section 8 when a rotational speed of the first motor 4 is reduced to substantially zero. Further, in the fixed mode, the engine 3 and the ring gear 16 of the transmission section 8 are always rotated at substantially same speeds. Here, it is to be noted that a toque amplification factor in the HV-Low mode is greater than that in the HV-High mode. Accordingly, the HV-Low mode corresponds to a "first hybrid mode" of the embodiment of the present disclosure, and the HV-High mode corresponds to a "second hybrid mode" of the embodiment of the present disclosure.

The EV mode may be selected from a dual-motor mode in which both of the first motor 4 and the second motor 5 generate drive torques to propel the vehicle Ve, and a single-motor mode (or a disconnecting mode) in which only the second motor 5 generates a drive torque to propel the vehicle Ve. Further, the dual-motor mode may be selected from an Electric Vehicle-Low mode (to be abbreviated as the "EV-Low mode" hereinafter) in which a torque of the first motor 4 is multiplied by a relatively larger factor, and an Electric Vehicle-High mode (to be abbreviated as the "EV-High mode" hereinafter) in which a torque of the first motor 4 is multiplied by a relatively smaller factor. In the single-motor mode, the vehicle Ve is powered only by the second motor 5 while disengaging both of the first clutch CL1 and the second clutch CL2 or engaging any one of the first clutch CL1 and the second clutch CL2.

FIG. 3 shows engagement states of the first clutch CL1, the second clutch CL2, and the brake B1, and operating conditions of the first motor 4, the second motor 5, and the engine 3 in each operating mode. In FIG. 3, "●" represents that the engagement device is in engagement, "–" represents that the engagement device is in disengagement, "G" represents that the motor serves mainly as a generator, "M" represents that the motor serves mainly as a motor, blank represents that the motor serves as neither a motor nor a generator or that the motor is not involved in propulsion of the vehicle Ve, "ON" represents that the engine 3 generates a drive torque, and "OFF" represents that the engine 3 does not generate a drive torque.

Rotational speeds of the rotary elements of the power split mechanism 6, and directions of torques of the engine 3, the first motor 4, and the second motor 5 in each operating mode are indicated in FIGS. 4 to 9. In the nomographic diagrams shown in FIGS. 4 to 9, distances among the vertical lines represents a gear ratio of the power split mechanism 6, a vertical distance on the vertical line from the horizontal base line represents a rotational speed of the rotary member, an orientation of the arrow represents a direction of the torque, and a length of the arrow represents a magnitude of the torque.

Figure 4:
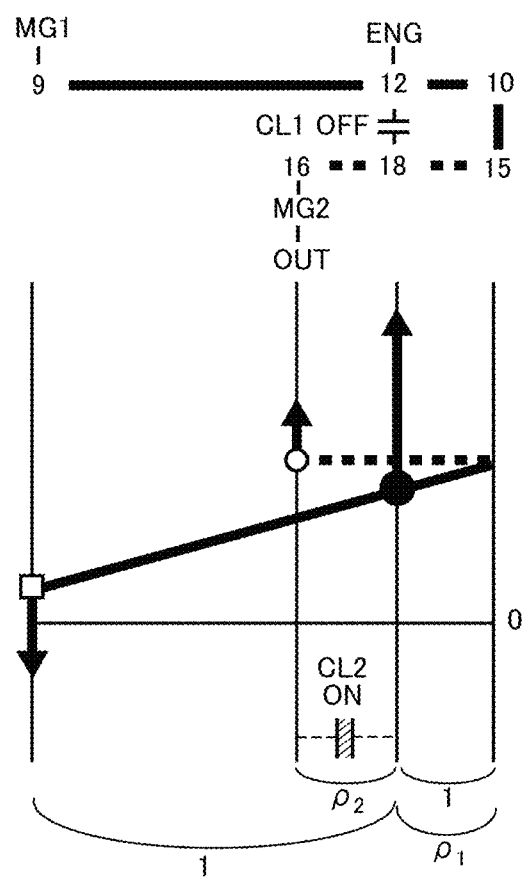
FIG. 4 is a nomographic diagram showing a situation in a HV-High mode.
Figure 5:
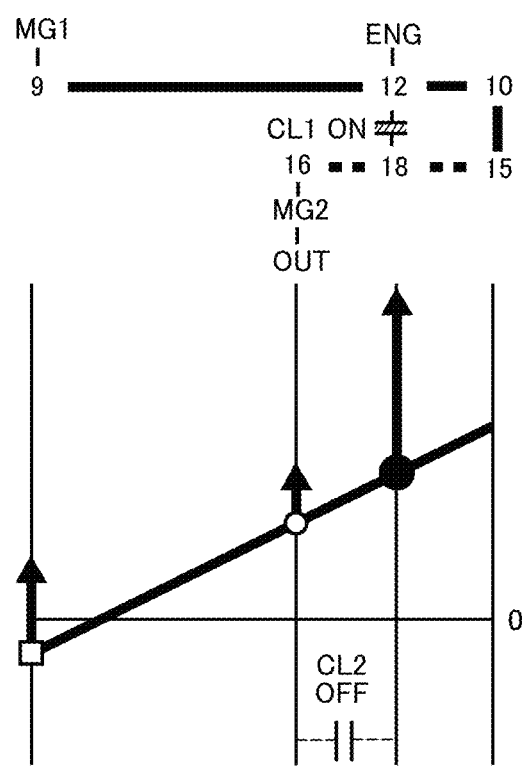
FIG. 5 is a nomographic diagram showing a situation in a HV-Low mode.

As indicated in FIG. 4, in the HV-High mode, the second clutch CL2 is engaged, and the engine 3 generates a drive torque while establishing a reaction torque by the first motor 4. As indicated in FIG. 5, in the HV-Low mode, the first clutch CL1 is engaged, and the engine 3 generates a drive torque while establishing a reaction torque by the first motor 4. In the HV-High mode and the HV-Low mode, a rotational speed of the first motor 4 is controlled in such a manner as to optimize a total energy efficiency in the drive unit 2 including a fuel efficiency of the engine 3 and a driving efficiency of the first motor 4. Specifically, the total energy efficiency in the drive unit 2 may be calculated by dividing a total energy consumption by a power to rotate the front wheels 1R and 1L. A rotational speed of the first motor 4 may be varied continuously, and the rotational speed of the engine 3 is governed by the rotational speed of the first motor 4 and a speed of the vehicle Ve. That is, the power split mechanism 6 may serve as a continuously variable transmission.

As a result of establishing a reaction torque by the first motor 4, the first motor 4 serves as a generator. In this situation, therefore, a power of the engine 3 is partially translated into an electric energy, and the remaining power of the engine 3 is delivered to the ring gear 16 of the transmission section 8. Specifically, the reaction torque established by the first motor 4 is governed by a split ratio of the torque delivered from the engine 3 to the first motor 4 side through the power split mechanism 6. Such split ratio between the torque delivered from the engine 3 to the first motor 4 side through the power split mechanism 6 and the torque delivered from the engine 3 to the ring gear 16 differs between the HV-Low mode and the HV-High mode.

Given that the torque delivered to the first motor 4 side is "1", a ratio of the torque applied to the ring gear 16 in the HV-Low mode may be expressed as "$1/(\rho 1 \cdot \rho 2)$", and a ratio of the torque applied to the ring gear 16 in the HV-High mode may be expressed as "$1/(\rho 1)$". In other words, given that the torque of the engine 3 is "1", a ratio of the torque of the engine 3 delivered to the ring gear 16 in the HV-Low mode may be expressed as "$1/(1-(\rho 1 \cdot \rho 2))$", and a ratio of the torque of the engine 3 delivered to the ring gear 16 in the HV-High mode may be expressed as "$1/(\rho 1+1)$". In the above expressions, "$\rho 1$" is a gear ratio of the power split section 7 (i.e., a ratio between teeth number of the ring gear 10 and teeth number of the sun gear 9), and "$\rho 2$" is a gear ratio of the transmission section 8 (i.e., a ratio between teeth number of the ring gear 16 and teeth number of the sun gear 15). Specifically, "$\rho 1$" and "$\rho 2$" are smaller than "1" each. That is, in the HV-Low mode, a ratio of the torque delivered to the ring gear 16 is increased in comparison with that in the HV-High mode.

Here, when the speed of the engine 3 is increased by the torque generated by the engine 3, the output torque of the engine 3 is reduced by a torque required to increase the speed of the engine 3. In the HV mode, the electric power generated by the first motor 4 may be supplied to the second motor 5, and in addition, the electric power accumulated in the electric storage device 30 may also be supplied to the second motor 5 as necessary.

Figure 6:
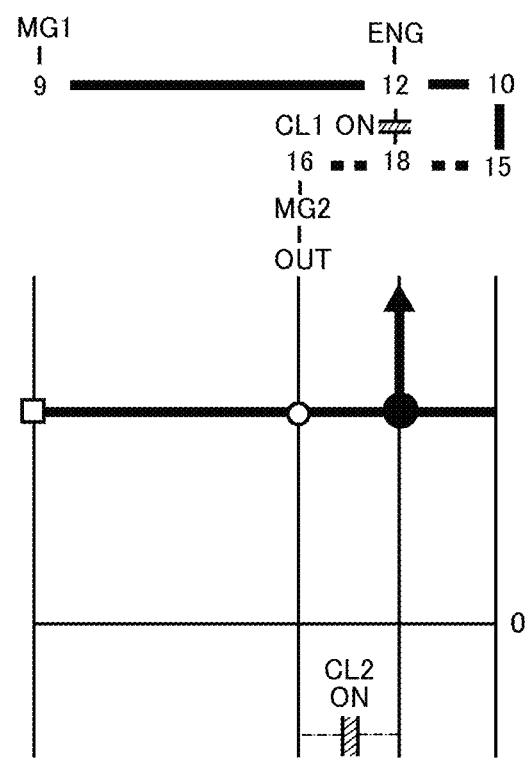
FIG. 6 is a nomographic diagram showing a situation in a fixed mode.

In the fixed mode, as indicated in FIG. 6, both of the first clutch CL1 and the second clutch CL2 are engaged so that all of the rotary elements in the power split mechanism 6 are rotated at same speeds. In other words, the output power of the engine 3 will not be translated into an electric energy by the first motor 4 and the second motor 5. For this reason, a power loss associated with such energy conversion will not be caused in the fixed mode and hence power transmission efficiency can be improved.

Figure 7:
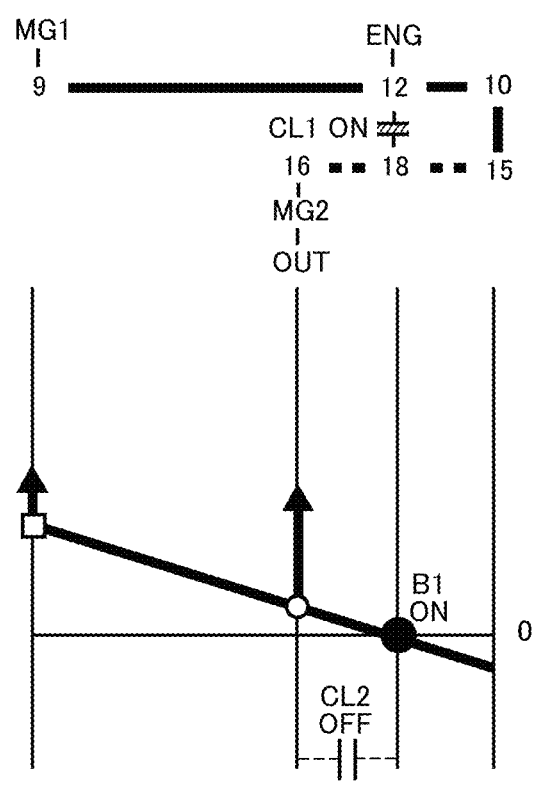
FIG. 7 is a nomographic diagram showing a situation in an EV-Low mode.
Figure 8:
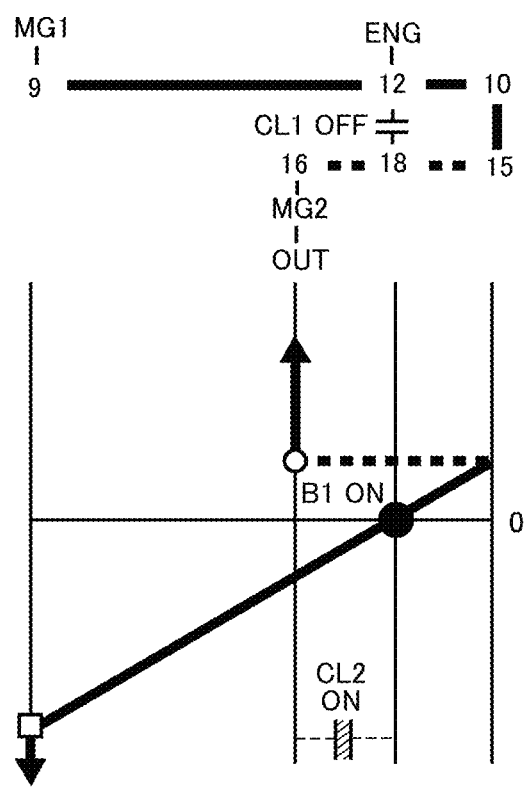
FIG. 8 is a nomographic diagram showing a situation in an EV-High mode.

As indicated in FIGS. 7 and 8, in the EV-Low mode and the EV-High mode, the brake B1 is engaged, and the first motor 4 and the second motor 5 generates the drive torques to propel the vehicle Ve. As indicated in FIG. 7, in the EV-Low mode, the vehicle Ve is propelled by the drive torques generated by the first motor 4 and the second motor 5 while engaging the brake B1 and the first clutch CL1. In this case, the brake B1 establishes a reaction torque to restrict a rotation of the output shaft 13 or the carrier 12. In the EV-Low mode, the first motor 4 is rotated in the forward direction while generating the torque in a direction to increase a rotational speed. As indicated in FIG. 8, in the EV-High mode, the vehicle Ve is propelled by the drive torques generated by the first motor 4 and the second motor 5 while engaging the brake B1 and the second clutch CL2. In this case, the brake B1 also establishes a reaction torque to restrict a rotation of the output shaft 13 or the carrier 12. In the EV-High mode, the first motor 4 is rotated in the opposite direction (i.e., in a reverse direction) to the rotational direction of the engine 3 in the HV mode, while generating torque in a direction to increase a rotational speed.

Figure 9:
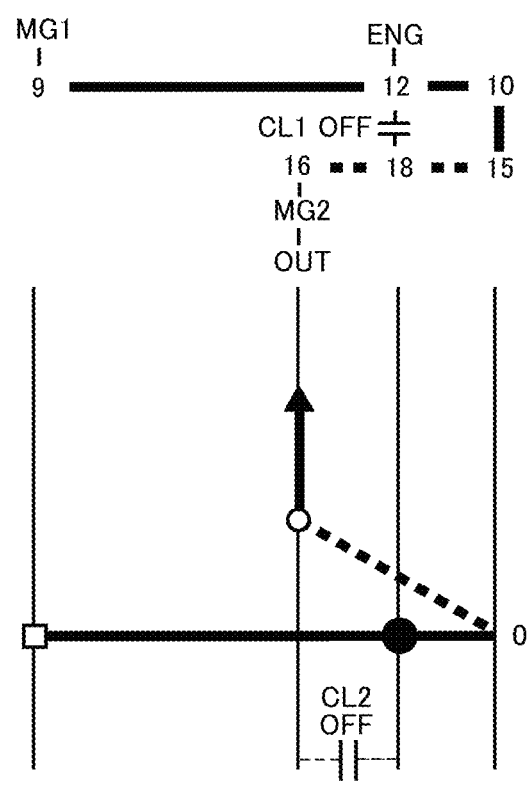
FIG. 9 is a nomographic diagram showing a situation in a single-motor mode.

In the EV-Low mode, a ratio of a rotational speed of the ring gear 16 of the transmission section 8 to a rotational speed of the first motor 4 is reduced smaller than that in the EV-High mode. That is, in the EV-Low mode, the rotational speed of the first motor 4 at a predetermined speed is increased higher than that in the EV-High mode. In other words, a speed reducing ratio in the EV-Low mode is greater than that in the EV-High mode. In the EV-Low mode, therefore, a larger drive force may be generated. Here, in the drive unit 2 shown in FIG. 1, the rotational speed of the ring gear 16 corresponds to a rotational speed of an output member, and the following explanation will be made on the assumption that a gear ratio among each member from the ring gear 16 to the front wheels 1R and 1L is "1" for the sake of convenience. As indicated in FIG. 9, in the single-motor mode, only the second motor 5 generates the drive torque, and both of the first clutch CL1 and the second clutch CL2 are disengaged. In the single-motor mode, therefore, all of the rotary elements of the power split mechanism 6 are stopped. For this reason, the engine 3 and the first motor 4 will not be rotated passively, and hence a power loss can be reduced.

In the vehicle Ve, the operating mode is selected on the basis of an SOC level of the electric storage device 30, a vehicle speed, a required drive force and so on. According to the embodiment, a selection pattern of the operating mode may be selected from a Charge Sustaining mode (to be abbreviated as the "CS mode" hereinafter) in which the operating mode is selected in such a manner as to maintain the SOC level of the electric storage device 30 as far as possible, and a Charge Depleting mode (to be abbreviated as the "CD mode" hereinafter) in which the operating mode is selected in such a manner as to propel the vehicle Ve while consuming the electric power accumulated in the electric storage device 30. Specifically, the CS mode is selected when the SOC level of the electric storage device 30 is relatively low, and the CD mode is selected when the SOC level of the electric storage device 30 is relatively high.

Figure 10:
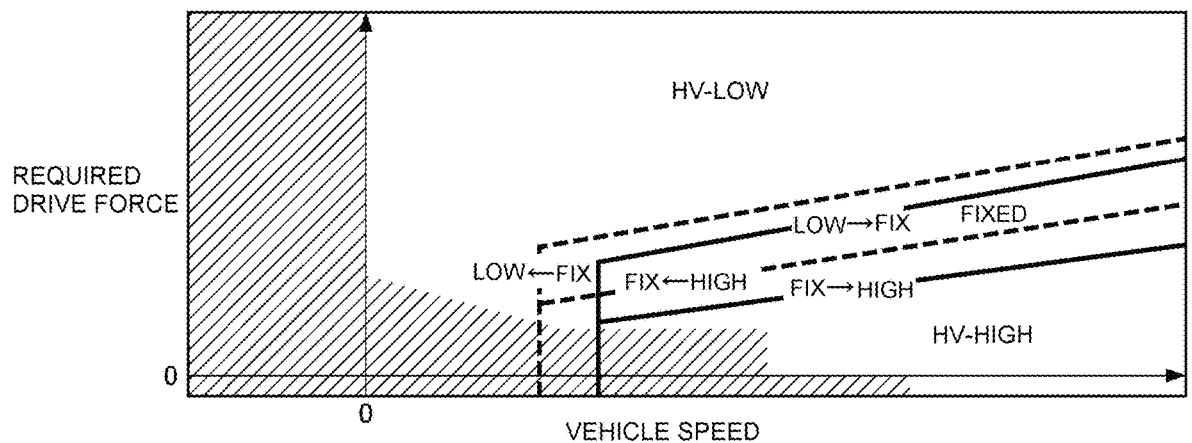
FIG. 10 shows a map for determining an operating mode during propulsion in a CS mode.

FIG. 10 shows an example of a map used to select the operating mode during propulsion in the CS mode. In FIG. 10, the vertical axis represents a required drive force, and the horizontal axis represents a vehicle speed. In order to select the operating mode of the vehicle Ve, the vehicle speed may be detected by a vehicle speed sensor, and the required drive force may be estimated based on an accelerator position detected by an accelerator sensor.

In FIG. 10, the hatched region is an area where the single-motor mode is selected, and the hatched region is determined based on specifications of the second motor 5. In the CS mode, the single-motor mode is selected when the vehicle Ve is propelled in a reverse direction irrespective of the required drive force, and when the vehicle Ve is propelled in a forward direction and the required drive force is small (or when decelerating).

During forward propulsion in the CS mode, the HV mode is selected when a large drive force is required. In the HV mode, the drive force may be generated from a low speed range to a high speed range. When the SOC level of the electric storage device 30 falls close to a lower limit level, therefore, the HV mode may be selected even if an operating point governed by the required drive force and the vehicle speed falls within the hatched region.

As described, the HV mode may be selected from the HV-Low mode, the HV-High mode, and the fixed mode. In the CS mode, specifically, the HV-Low mode is selected when the vehicle speed is relatively low and the required drive force is relatively large, the HV-High mode is selected when the vehicle speed is relatively high and the required drive force is relatively small, and the fixed mode is selected when the operating point falls between a region where the HV-Low mode is selected and a region where the HV-High mode is selected.

In the CS mode, the operating mode is shifted from the fixed mode to the HV-Low mode when the operating point is shifted across the "Low←Fix" line from right to left, or when the operating point is shifted across the "Low←Fix" line upwardly from the bottom. By contrast, the operating mode is shifted from the HV-Low mode to the fixed mode when the operating point is shifted across the "Low→Fix" line from left to right, or when the operating point is shifted across the "Low→Fix" line downwardly from the top. Likewise, the operating mode is shifted from the HV-High mode to the fixed mode when the operating point is shifted across the "Fix←High" line from right to left, or when the operating point is shifted across the "Fix←High" line upwardly from the bottom. By contrast, the operating mode is shifted from the fixed mode to the HV-High mode when the operating point is shifted across the "Fix→High" line from left to right, or when the operating point is shifted across the "Fix→High" line downwardly from the top.

Figure 11:
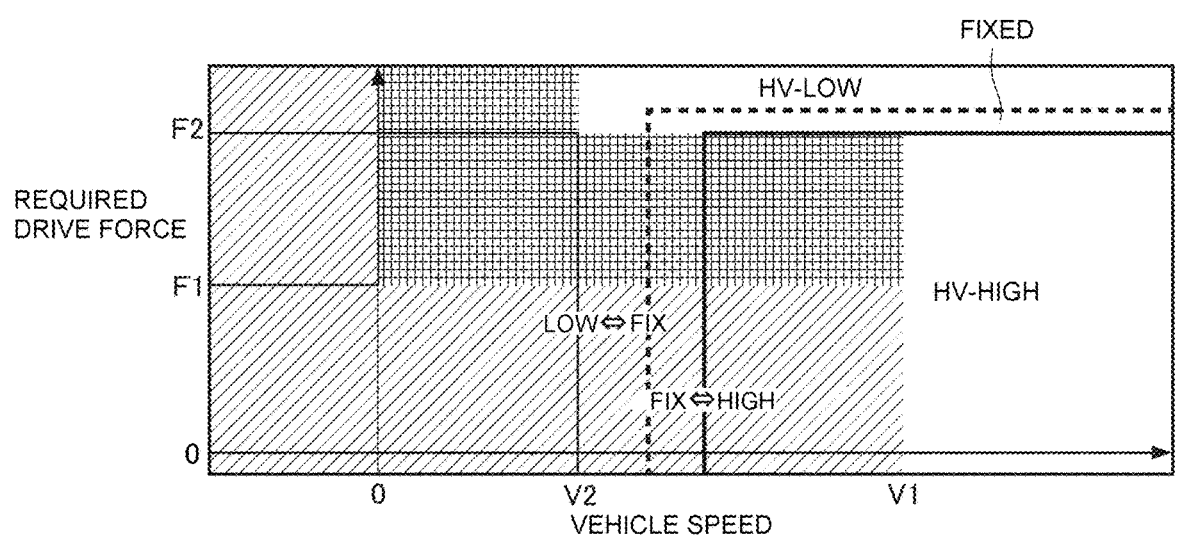
FIG. 11 shows a map for determining an operating mode during propulsion in a CD mode.

FIG. 11 shows an example of a map used to select the operating mode during propulsion in the CD mode. In FIG. 11, the vertical axis also represents the required drive force, and the horizontal axis also represents the vehicle speed.

In FIG. 11, the hatched region is also an area where the single-motor mode is selected. In the CD mode, the single-motor mode is also selected when the vehicle Ve is propelled in the reverse direction irrespective of the required drive force, and when the vehicle Ve is propelled in the forward direction and the required drive force is smaller than a first threshold force value F1 (or when decelerating). Such region where the single-motor mode is selected is also determined based on specifications of the second motor 5 and so on.

During forward propulsion in the CD mode, the dual-motor mode is selected when the drive force larger than a first threshold force value F1 is required. In this case, the HV mode is selected when the vehicle speed is higher than a first threshold speed V1, or when the vehicle speed is higher than a second threshold speed V2 and the required drive force is greater than a second threshold force value F2. As described, in the HV mode, the drive force may be generated from the low speed range to the high speed range. When the SOC level of the electric storage device 30 falls close to the lower limit level, therefore, the HV mode may be selected even if the operating point falls within the regions where the single-motor mode and the dual-motor mode are selected.

In the CD mode, the HV-Low mode is also selected when the vehicle speed is relatively low and the required drive force is relatively large, the HV-High mode is also selected when the vehicle speed is relatively high and the required drive force is relatively small, and the fixed mode is also selected when the operating point falls between the region where the HV-Low mode is selected and the region where the HV-High mode is selected.

In the CD mode, specifically, the operating mode is shifted between the fixed mode and the HV-Low mode when the operating point is shifted across the "Low↔Fix" line. Likewise, the operating mode is shifted between the HV-High mode and the fixed mode when the operating point is shifted across the "Fix↔High".

In the maps shown in FIGS. 10 and 11, the regions of each of the operating mode and the lines defining the regions may be altered depending on temperatures of the members of the drive unit 2, the electric storage device 30, the power control systems 28 and 29, and an SOC level of the electric storage device 30.

As described, the operating mode of the vehicle Ve is shifted among the above-mentioned modes by manipulating the first clutch CL1, the second clutch CL2, and the brake B1, based on a required drive force governed by a position of the accelerator pedal. For example, when the accelerator pedal is depressed to increase the drive force during propulsion in the single-motor mode, the operating mode is shifted to the HV-mode by starting the engine 3. In this situation, if the required drive force is equal to or greater than the predetermined value, the operating mode will be shifted from the single-motor mode to the HV-Low mode in which a larger drive force can be generated compared to the HV-High mode. As described, in the case of shifting the operating mode to the HV-Low mode, the first clutch CL1 is engaged in conjunction with starting the engine 3. Specifically, the drive member and the driven member of the first clutch CIA are connected to each other to transmit torque therebetween. In this case, in order to reduce an engagement shock, a speed difference between the drive member and the driven member of the first clutch CIA is reduced to a synchronous speed.

As described, the ratio of the torque delivered to the ring gear 16 in the HV-Low mode is greater than the ratio of the torque delivered to the ring gear 16 in the HV-High mode. That is, a maximum drive force in the HV-Low mode is greater than a maximum drive force in the HV-High mode. In order to reduce an engagement shock of the engagement device when shifting the operating mode, a synchronous control is executed to reduce a speed difference between the drive member (i.e., an input member) and the driven member (i.e., an output member) of the engagement device to be engaged to an allowable value. Thereafter, the engagement device is engaged so that the torque can be transmitted between the engine 3 and the first motor 4. As a result, the engine 3 is allowed to be started. The synchronous control of the first clutch CL1 to be executed when shifting the operating mode from the single-motor mode to the HV-Low mode is shown in FIG. 12, and the synchronous control of the second clutch CL2 to be executed when shifting the operating mode from the single-motor mode to the HV-High mode is shown in FIG. 13.

Figure 12:
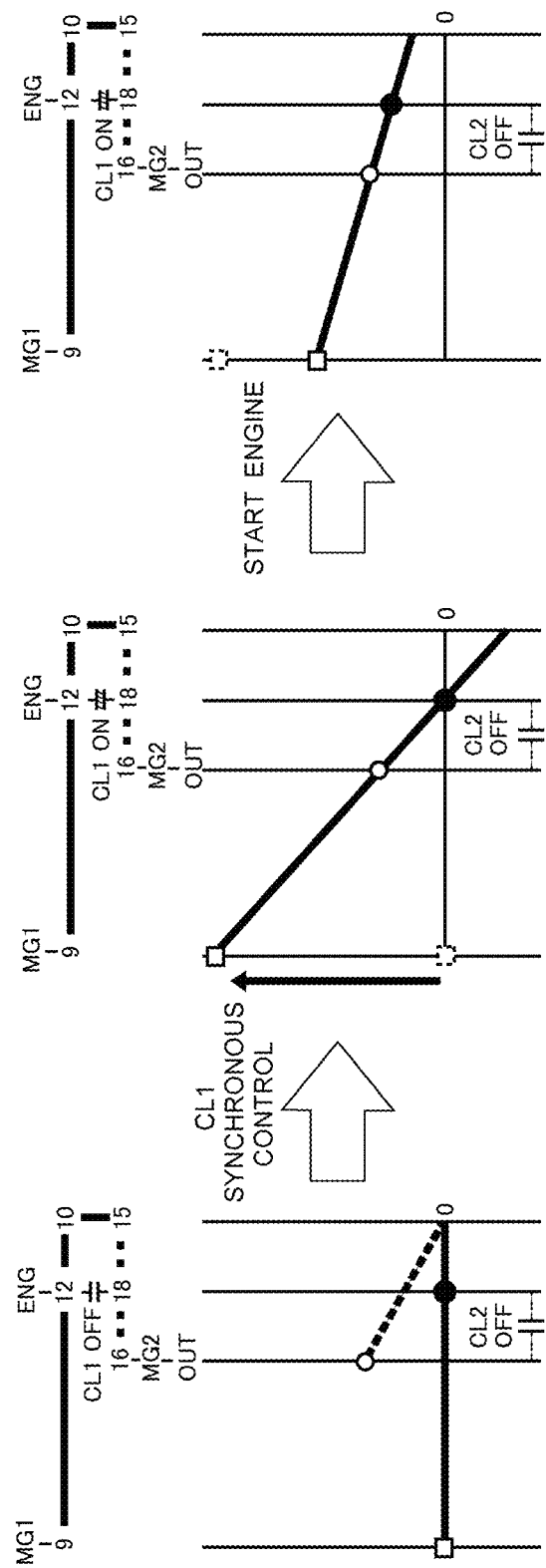
FIG. 12 is a nomographic diagram showing a synchronous control of a first clutch executed in a case of shifting the operating mode from the single-motor mode to the HV-Low mode.
Figure 13:
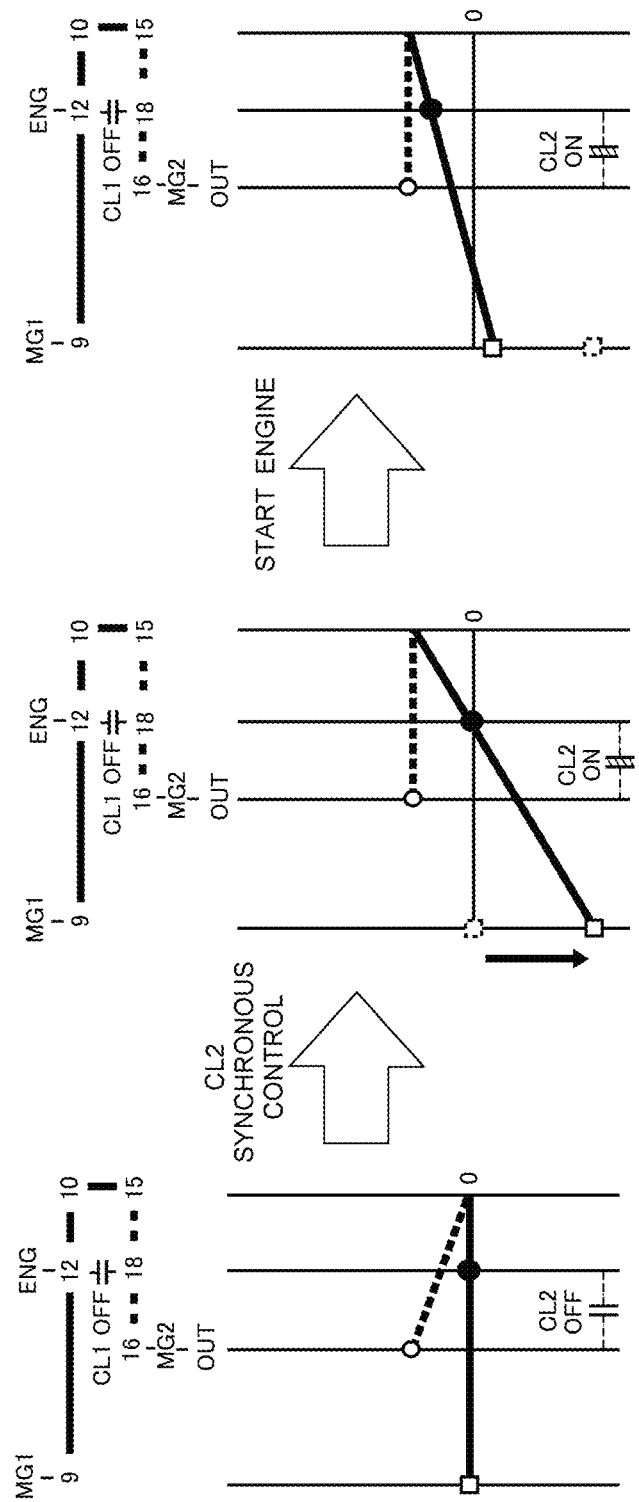
FIG. 13 is a nomographic diagram showing a synchronous control of a second clutch executed in a case of shifting the operating mode from the single-motor mode to the HV-High mode.

As can be seen from FIGS. 12 and 13, a speed difference between the rotary members 12a and 12b of the first clutch CL1 in the case of shifting the operating mode from the single-motor mode to the HV-Low mode is larger than a speed difference between the rotary members 18a and 18b of the second clutch CL2 in the case of shifting the operating mode from the single-motor mode to the HV-High mode. In addition, a change amount and a change rate of a speed of the first motor 4 in the case of shifting the operating mode from the single-motor mode to the HV-Low mode indicated by the thin black arrow in FIG. 12 are individually larger than a change amount and a change rate of a speed of the first motor 4 in the case of shifting the operating mode from the single-motor mode to the HV-High mode as indicated by the thin black arrow in FIG. 13. That is, a required period of time to complete the synchronous control in the case of shifting the operating mode from the single-motor mode to the HV-Low mode is longer than a required period of time to complete the synchronous control in the case of shifting the operating mode from the single-motor mode to the HV-High mode. In other words, a required period of time until the drive force is established in the case of shifting the operating mode from the single-motor mode to the HV-Low mode is longer than a required period of time until the drive force is established in the case of shifting the operating mode from the single-motor mode to the HV-High mode.

Thus, in the case of shifting the operating mode from the single-motor mode to the HV-Low mode, the speed difference between the rotary members 12a and 12b of the first clutch CL1 is relatively large. In this case, therefore, it takes longer time to start the engine 3. That is, it takes longer time to establish the drive force. In order to establish the drive force as quickly as possible in the case of shifting the operating mode from the single-motor mode to the HV-Low mode, according to the exemplary embodiment of the present disclosure, the ECU 31 is configured to execute a routine shown in FIG. 14.

At step S1, it is determined whether the vehicle Ve is currently propelled in the single-motor mode. In other words, at step S1, it is determined whether the vehicle Ve is currently powered only by the second motor 5. As described, the single-motor mode is selected when a required drive force is small or a current vehicle speed is low. If the vehicle is not propelled in the single-motor mode so that the answer of step S1 will be NO, the routine returns.

By contrast, if the vehicle Ve is currently propelled in the single-motor mode so that the answer of step S1 is YES, the routine progresses to step S2 to detect a position of the accelerator pedal by the accelerator sensor.

Then, it is determined at step S3 whether the engine 3 is required to be started to shift the operating mode to the HV mode. For example, such determination at step S3 may be made based on the position of the accelerator pedal detected at step S2. Specifically, if the position of the accelerator pedal is deeper than predetermined degrees so that the operating point of the vehicle Ve is shifted from the hatched region to the region where the HV-Low mode is selected in the map shown in FIG. 10 or 11, the answer of step S3 will be YES. In this situation, the mode change predictor 32a predicts that a mode change will be executed to shift the operating mode from the single-motor mode to the HV-Low mode.

If the engine 3 is not required to be started so that the answer of step S3 is NO, the routine returns to step S2 to continue the detection of the position of the accelerator pedal until the accelerator pedal is depressed deeper than the degrees at which the engine 3 is started. By contrast, if the engine 3 is required to be started so that the answer of step S3 is YES, the routine progresses to step S4 to reduce a speed difference in the second clutch CL2. Specifically, in the second clutch CL2, a speed difference between the rotary member 18a connected to the carrier 18 and the rotary member 18b connected to the ring gear 16 is reduced to a predetermined value or smaller at which an engagement shock generated by engaging the second clutch CL2 is reduced to an acceptable magnitude.

As described, when the accelerator pedal is depressed deeper than the predetermined degrees, a determination to shift the operating mode from the EV mode to the HV mode is made, and the first clutch CL1 or the second clutch CL2 will be engaged. In this situation, since the mode change predictor 32a has predicted that the operating mode will be shifted from the single-motor mode to the HV-Low mode, the first clutch CL1 will be engaged. However, in the case of shifting the operating mode from the single-motor mode to the HV-Low mode, a change amount and a change rate of a speed of the first motor 4 are individually larger. That is, the speed difference between the rotary members 12a and 12b of the first clutch CL1 is relatively large and hence it takes longer time until the engine 3 is started. In order to start the engine 3 promptly in the case of shifting the operating mode from the single-motor mode to the HV-Low mode, according to the exemplary embodiment of the present disclosure, the second clutch CL2 in which speeds of the rotary members 18a and 18b thereof can be synchronized with each other more promptly is engaged temporarily. That is, the operating mode will be shifted from the single-motor mode to the HV-Low mode via the HV-High mode.

In the drive unit 2, when the sun gear 9 is rotated by the first motor 4 during forward propulsion, the ring gear 10 and the sun gear 15 connected thereto are rotated at a rotational speed of the first motor 4, and consequently, the carrier 18 is rotated at a speed governed by rotational speeds of the sun gear 15 and the ring gear 16 connected to the output gear 19. As described, the rotary member 12b as a driven member of the first clutch CL1 and the rotary member 18a as a drive member of the second clutch CL2 are connected to the carrier 18. That is, the rotary member 12b of the first clutch CL1 and the rotary member 18a of the second clutch CL2 are rotated at the rotational speed of the first motor 4. Therefore, a speed difference between the rotary members 12a and 12b of the first clutch CL1, and a speed difference between the rotary members 18a and 18b of the second clutch CL2 can be controlled by controlling the speed of the first motor 4.

When the speed difference between the rotary members 18a and 18b of the second clutch CL2 is reduced to the predetermined value by reducing the speed of the first motor 4, the second clutch CL2 is engaged at step S5. Specifically, when the synchronous control of the second clutch CL2 is completed, a command value of a current applied to the actuator to engage the second clutch CL2 is calculated and transmitted to the actuator.

Then, it is determined at step S6 whether the second clutch CL2 is engaged completely. If the second clutch CL2 has not yet been engaged completely, specifically, if the speed difference between the rotary members 18a and 18b of the second clutch CL2 has not yet been reduced to the predetermined value so that the answer of step S6 is NO, the routine returns to step S5 to continue the engaging operation until the second clutch CL2 is engaged completely. By contrast, if the second clutch CL2 has been engaged completely so that the answer of step S6 is YES, the routine progresses to step S7 to start engine 3 thereby shifting the operating mode to the HV-High mode. Specifically, the engine 3 is started by increasing a speed of the first motor 4 while engaging the second clutch CL2. In this situation, the speed of the first motor 4 is controlled in such a manner as to optimize a total efficiency of the drive unit 2 including a fuel efficiency of the engine 3 and a drive efficiency of the first motor 4.

Then, at step S8, a speed difference in the first clutch CL1 is reduced. Specifically, in the first clutch CL1, a speed difference between the rotary member 12a connected to the carrier 12 and the rotary member 12b connected to the carrier 18 is reduced to a predetermined value or smaller at which an engagement shock generated by engaging the first clutch CL1 is reduced to an acceptable magnitude.

In this situation, in order to start the engine 3 promptly, the operating mode has been temporarily shifted to the HV-High mode in which a change in the speed of the first motor 4 resulting from shifting the operating mode thereto from the single-motor mode is relatively small. At step S8, therefore, the speed difference between the rotary members 12a and 12b of the first clutch CL1 is reduced by the first motor 4 for the preparation of engaging the first clutch CL1 to further shift the operating mode to the HV-Low mode.

When the speed difference between the rotary members 12a and 12b of the first clutch CL1 is reduced to the predetermined value by reducing the speed of the first motor 4, the first clutch CL1 is engaged at step S9. Specifically, when the synchronous control of the first clutch CL1 is completed, a command value of a current applied to the actuator to engage the first clutch CL1 is calculated and transmitted to the actuator. Then, it is determined at step S10 whether the first clutch CL1 is engaged completely. In this situation, the second clutch CL2 is disengaged in conjunction with the engagement of the first clutch CL1. However, the first clutch CL1 may be engaged not only simultaneously with disengaging the second clutch CL2 but also prior to disengaging the second clutch CL2. Given that the first clutch CL1 is engaged prior to disengaging the second clutch CL2, both of the first clutch CL1 and the second clutch CL2 will be engaged temporarily so that the operating mode will be shifted temporarily to the fixed mode.

If the first clutch CL1 has not yet been engaged completely, specifically, if the speed difference between the rotary members 12a and 12b of the first clutch CL1 has not yet been reduced to the predetermined value so that the answer of step S10 is NO, the routine returns to step S9 to continue the engaging operation until the first clutch CL1 is engaged completely. By contrast, if the first clutch CL1 has been engaged completely so that the answer of step S10 is YES, the routine progresses to step S11 to adjust the speed of the engine 3 by the first motor 4 to a speed at which a required power is generated. As a result, the shifting operation of the operating mode to the HV-Low mode is completed.

Next, here will be explained a comparative example with reference to FIG. 17. As the conventional art, according to the routine shown in FIG. 17, steps S4 to S6 are omitted so that the operating mode is shifted from the single-motor mode directly to the HV-Low mode. In the following descriptions, explanation for the steps in common with those of the routine shown in FIG. 14 will be simplified.

Figure 17:
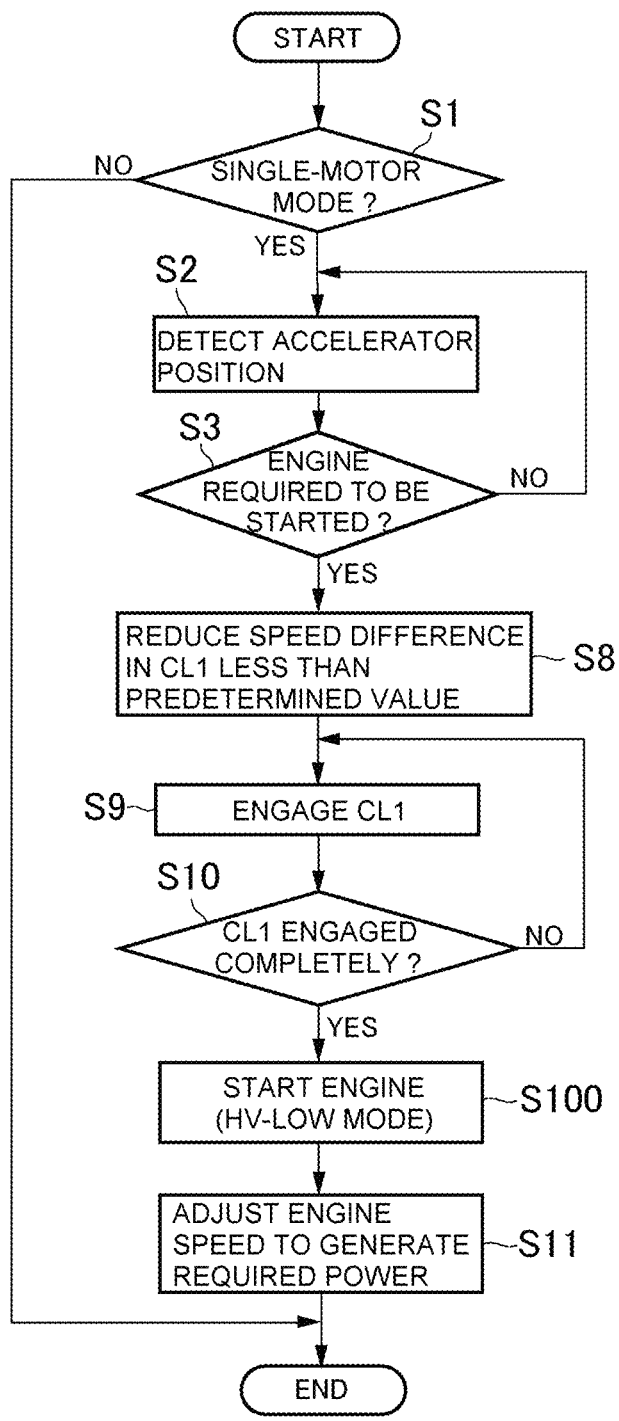
FIG. 17 is a flow chart showing a routine according to a comparative example.

According to the routine shown in FIG. 17, when the accelerator pedal is depressed deeper than the predetermined degrees during propulsion in the single motor mode so that the answer of step S3 is YES, the routine progress to step S8 to reduce a speed difference in the first clutch CL1 to the predetermined value or smaller. Then, when the first clutch CL1 has been engaged completely so that the answer of step S10 is YES, the routine progresses to step S100 to start the engine 3 by reducing a speed of the first motor 4 while engaging the first clutch CL1. Consequently, the operating mode is shifted directly to the HV-Low mode. Thereafter, at step S11, the speed of the engine 3 is adjusted by the first motor 4 to a speed at which a required power is generated.

Figure 14:
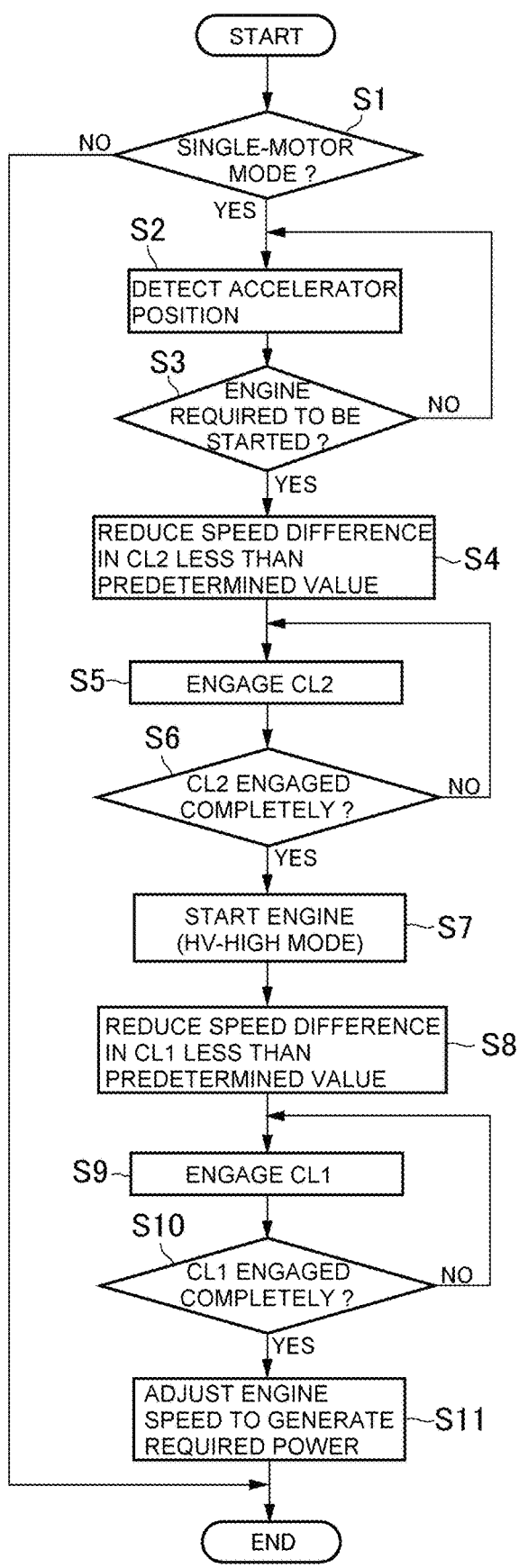
FIG. 14 is a flowchart showing one example of a routine executed by the control system according to the example of the present disclosure.
Figure 15:
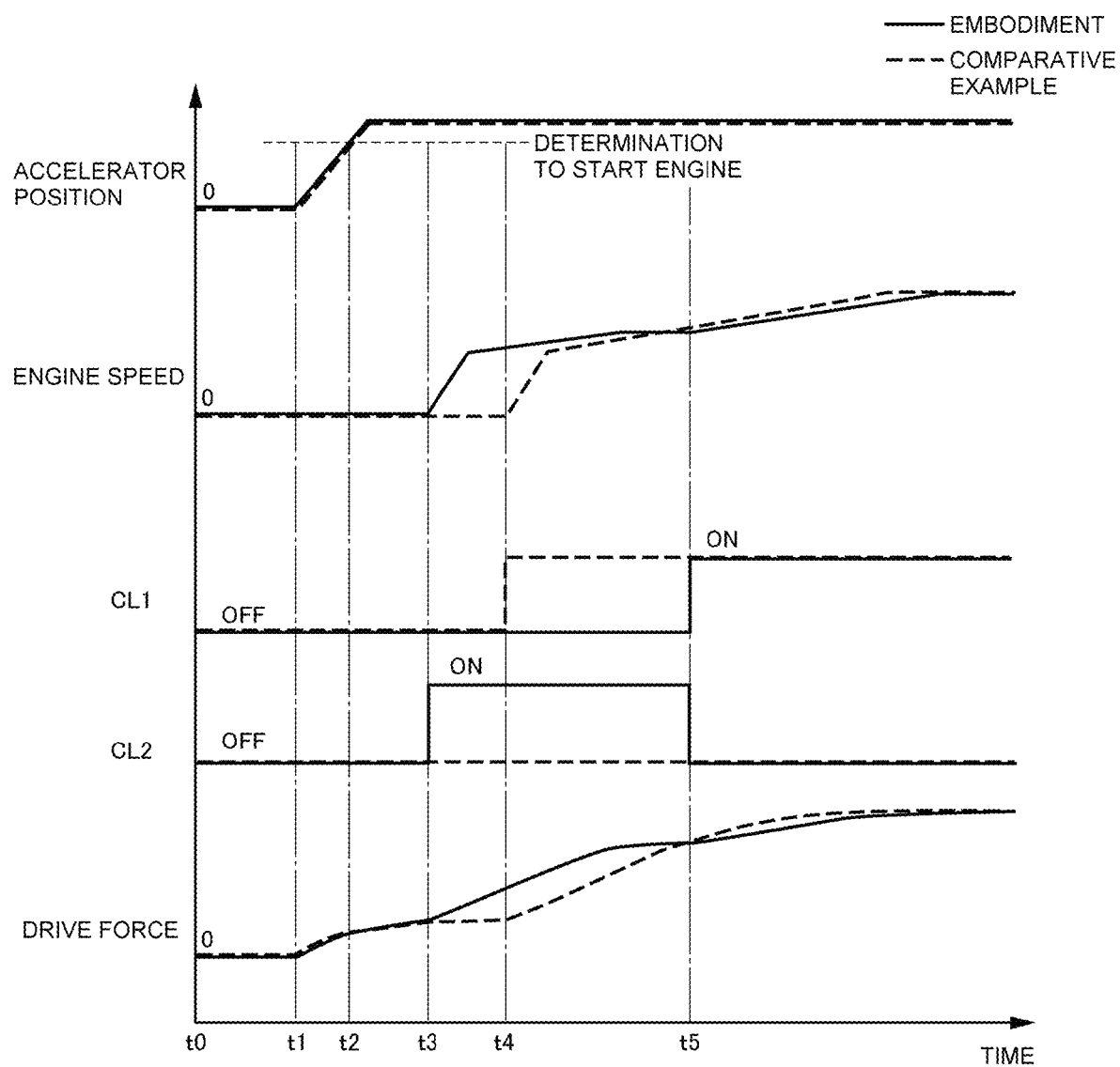
FIG. 15 is a time chart showing a temporal change in the situation of the hybrid vehicle during execution of the routine shown in FIG. 14.

Turning to FIG. 15, there are shown temporal changes in condition of the vehicle Ve during execution of the routine shown in FIG. 14. In FIG. 15, solid curves indicate changes in parameters of the vehicle Ve during execution of the routine FIG. 14, and dashed curves indicate changes in parameters of the vehicle Ve during execution of the routine FIG. 17.

First of all, temporal changes in the conditions of the vehicle Ve during execution of the routine shown in FIG. 14 will be explained hereinafter. At point t0, the vehicle Ve is propelled in the single-motor mode while disengaging both of the first clutch CL1 and the second clutch CL2. In this situation, the engine 3 has not yet been started and hence a speed of the engine 3 is zero. At point t1, the accelerator pedal is further depressed and a drive force to propel the vehicle Ve is increased with the depression of the accelerator pedal.

At point t2, a position of the accelerator pedal reaches the predetermined degrees at which the engine 3 is started.

Consequently, a satisfaction of the condition to shift the operating mode to the HV-Low mode by starting the engine 3 is determined at step S3. Consequently, the synchronous control of the second clutch CL2 is started from point t2. As described, the speed difference between the rotary members 18a and 18b of the second clutch CL2 in the case of shifting the operating mode from the single-motor mode to the HV-High mode is relatively small. According to the example of the present disclosure, therefore, the speed difference between the rotary members 18a and 18b of the second clutch CL2 is reduced in this situation for the preparation of shifting the operating mode temporarily to the HV-High mode.

When the speed difference between the rotary members 18a and 18b of the second clutch CL2 has been reduced to the synchronous speed and the engagement of the second clutch CL2 has been completed at point t3, a cranking of the engine 3 by the first motor 4 is started to shift the operating mode to the HV-High mode. Consequently, the operating mode is shifted to the HV-High mode and the drive force is increased. Thus, according to the exemplary embodiment of the present disclosure, the engine 3 can be started earlier to increase the drive force promptly.

Thereafter, in order to achieve a required drive force, the operating mode is further shifted to the HV-Low mode from point t5. Specifically, the speed difference between the rotary members 12a and 12b of the first clutch CL1 is reduced to the synchronous speed by the synchronous control. Eventually, at point t5, the speed difference between the rotary members 12a and 12b of the first clutch CL1 is reduced to the synchronous speed and the engagement of the first clutch CL1 is completed. In this situation, the second clutch CL2 is disengaged. Instead, as described above, the second clutch CL2 may also be disengaged after the completion of the engagement of the first clutch CL1. After shifting the operating mode to the HV-High mode, the speed of the engine 3 is further increased thereby generating the required drive force.

By contrast, according to the comparative example, the operating mode is shifted from the single-motor mode directly to the HV-Low mode. In this case, the speed difference between the rotary members 12a and 12b of the first clutch CL1 is relatively larger. Therefore, as indicated by the dashed curve, the engine 3 is started at a later point of time compared to the exemplary embodiment of the present disclosure. Moreover, the drive force is increased only slightly from point t3 to point t4. Thus, according to the comparative example, the startup of the engine 3 is delayed, and a plateau period of the drive force is longer.

Figure 16:
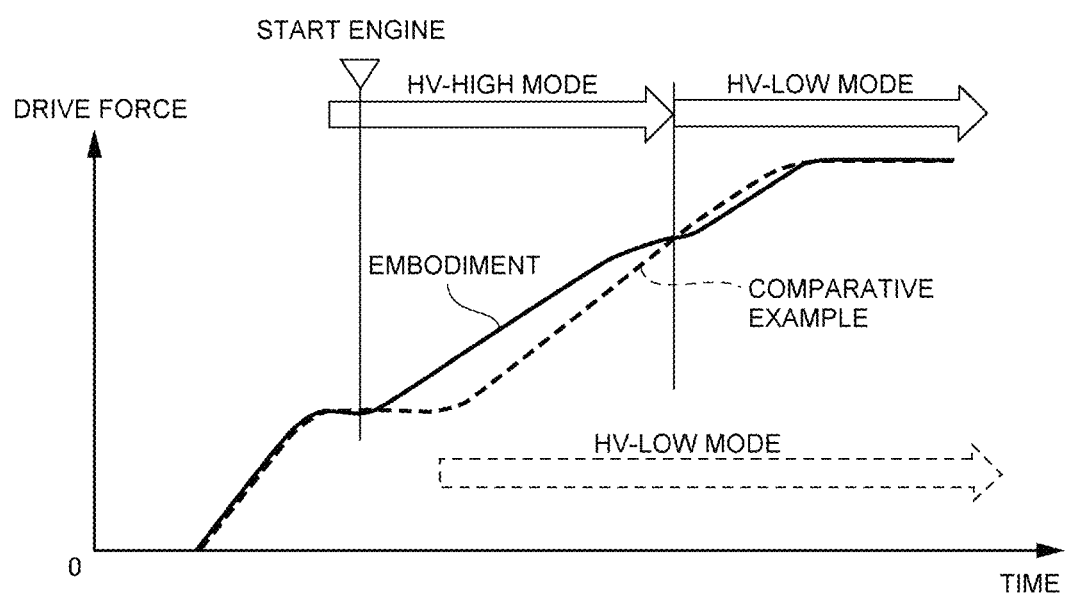
FIG. 16 is a graph showing an advantage of the example of the present disclosure.

Thus, according to the exemplary embodiment of the present disclosure, the operating mode is shifted from the single-motor mode to the HV-Low mode via the HV-High mode. As described, in the case of shifting the operating mode from the single-motor mode to the HV-Low mode, the speed difference between the rotary members 12a and 12b of the first clutch CL1 is relatively larger, and hence it takes longer time to start the engine 3. In this situation, the drive force to propel the vehicle Ve is not established until the engine 3 is started. According to the exemplary embodiment of the present disclosure, therefore, the operating mode is shifted from the single-motor mode temporarily to the HV-High mode by engaging the second clutch CL2 in which the speed difference between the rotary members 18a and 18b is relatively small, and further shifted to the HV-Low mode. Since the engine 3 is started earlier, as indicated by the solid curve in FIG. 16, the drive force may be increased promptly in comparison with the case of shifting the operating mode from the single-motor directly to the HV-Low mode as indicated by the dashed curve in FIG. 16.

That is, according to the exemplary embodiment of the present disclosure, a plateau period of the drive force may be reduced during the transient state of shifting the operating mode from the single-motor mode to the HV-Low mode. For this reason, a temporal drop in the drive force can be prevented in the case of shifting the operating mode from the single-motor mode to the HV-Low mode. In addition, the vehicle Ve can be accelerated smoothly and continuously in the case of shifting the operating mode from the single-motor mode to the HV-Low mode.

Although the above exemplary embodiments of the present disclosure have been described, it will be understood by those skilled in the art that the present disclosure should not be limited to the described exemplary embodiments, and various changes and modifications can be made within the scope of the present disclosure.

What is claimed is:

1. A control system for a hybrid vehicle, comprising:
a prime mover including an engine, a first motor, and a second motor;
a first differential mechanism that performs a differential action among a first rotary element that is connected to the engine, a second rotary element that is connected to the first motor, and a third rotary element;
a second differential mechanism that performs a differential action among a fourth rotary element that is connected to the second motor and a pair of drive wheels, a fifth rotary element that is connected to the third rotary element, and a sixth rotary element;
a first engagement device that selectively connects the first rotary element to the sixth rotary element; and
a second engagement device that selectively connects any two of the fourth rotary element, the fifth rotary element, and the sixth rotary element,
wherein an operating mode is selected from a plurality of modes including
a first hybrid mode established by engaging the first engagement device,
a second hybrid mode established by engaging the second engagement device, in which the torque delivered to the drive wheels is smaller compared to the first hybrid mode, and
a single-motor mode established by disengaging both of the first engagement device and the second engagement device, in which the hybrid vehicle is propelled only by a drive torque generated by the second motor,
each of the first engagement device and the second engagement device comprises a drive member and a driven member engaged to each other to transmit the torque,
a speed difference between the drive member and the driven member of each of the first engagement device and the second engagement device is controlled by the first motor, and
the control system comprises a controller that is configured to
predict an execution of a mode change from the single-motor mode to the first hybrid mode, and
execute the mode change from the single-motor mode to the first hybrid mode via the second hybrid mode, if the execution of the mode change from the single-motor mode to the first hybrid mode is predicted.

2. The control system for the hybrid vehicle as claimed in claim 1, wherein the controller comprises
a mode change predictor that predicts an execution of the mode change, and
a mode changer that changes the operating mode based on a prediction made by the mode change predictor, and
the controller is further configured to execute the mode change from the single-motor mode to the first hybrid mode via the second hybrid mode by the mode changer, if the execution of the mode change from the single-motor mode to the first hybrid mode is predicted by the mode change predictor.

3. The control system for the hybrid vehicle as claimed in claim 2, wherein the controller is further configured to establish the first hybrid mode after starting an operation to establish the second hybrid mode, if the execution of the mode change from the single-motor mode to the first hybrid mode is predicted.

4. The control system for the hybrid vehicle as claimed in claim 1, wherein the controller is further configured to
predict the execution of the mode change from the single-motor mode to the first hybrid mode based on a position of an accelerator, and
execute the mode change from the single-motor mode to the first hybrid mode if the position of an accelerator is equal to or deeper than predetermined degrees.

5. The control system for the hybrid vehicle as claimed in claim 1, wherein the controller is further configured to
reduce a speed difference between the drive member and the driven member of the second engagement device to a predetermined value possible to engage the second engagement device, in a case of shifting the operating mode from the single-motor mode to the first hybrid mode via the second hybrid mode, and
engage the first engagement device while reducing a speed difference between the drive member and the driven member of the first engagement device to a predetermined value possible to engage the first engagement device, after the completion of engagement of the second engagement device.

6. The control system for the hybrid vehicle as claimed in claim 1, wherein the controller is further configured to disengage the second engagement device after the completion of the first engagement device, in the case of shifting the operating mode from the single-motor mode to the first hybrid mode via the second hybrid mode.

7. The control system for the hybrid vehicle as claimed in claim 1, wherein the speed difference between the drive member and the driven member of the first engagement device in the case of shifting the operating mode from the single-motor mode to the first hybrid mode is larger than the speed difference between the drive member and the driven member of the second engagement device in the case of shifting the operating mode from the single-motor mode to the second hybrid mode.

8. The control system for the hybrid vehicle as claimed in claim 1, wherein the controller is further configured to start the engine by the first motor when shifting the operating mode from the single-motor mode to the second hybrid mode.

* * * * *